T. J. BROPHY.
NUT LOCK.
APPLICATION FILED FEB. 10, 1910.
963,683.
Patented July 5, 1910.
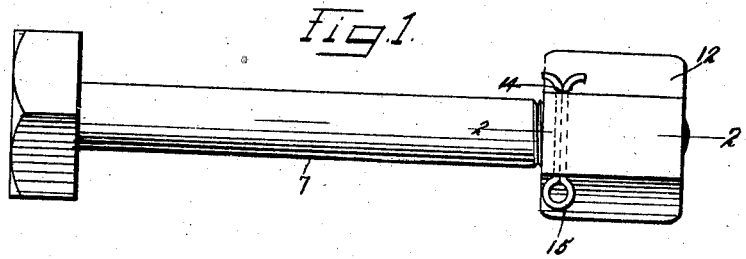
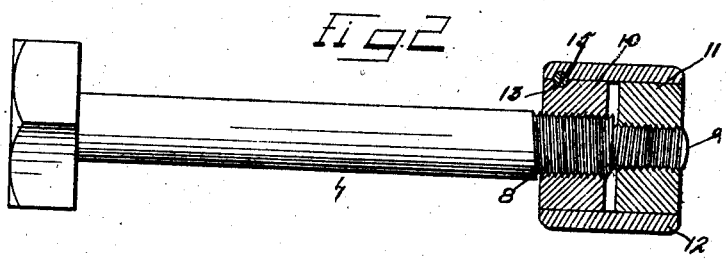
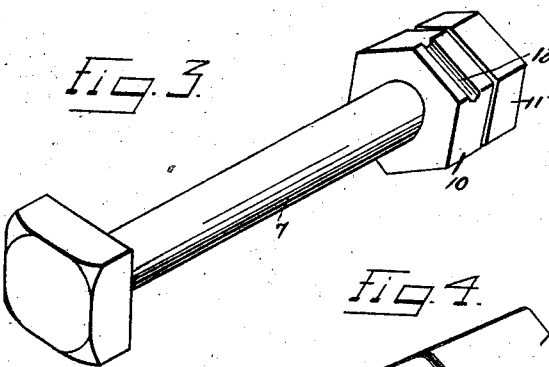
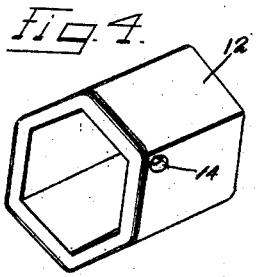
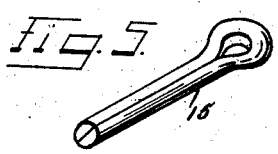
Witnesses
J. E. Strohl.
Francis Boyle
Inventor
Thomas J. Brophy.
By _____
Attorneys
THE NORRIS PETERS CO., WASHINGTON, D. C.

UNITED STATES PATENT OFFICE.

THOMAS J. BROPHY, OF NEW GALILEE, PENNSYLVANIA.

NUT-LOCK.

963,683.

Specification of Letters Patent.

Patented July 5, 1910.

Application filed February 10, 1910. Serial No. 543,085.

*To all whom it may concern:*

Be it known that I, THOMAS J. BROPHY, a citizen of the United States, residing at New Galilee, in the county of Beaver, State of Pennsylvania, have invented certain new and useful Improvements in Nut-Locks; and I do hereby declare the following to be a full, clear, and exact description of the invention, such as will enable others skilled in the art to which it appertains to make and use the same.

The invention resides in a novel form of has for an object to obviate the use of the usual locking washer arranged between a primary nut and jam nut.

This invention resides in a novel form of locking sleeve to fit over the jam nut and primary nut of the bolt and positively prevent the independent rotation of either nut.

One of the difficulties found in the use of the usual locking washer between a primary and jam nut is that after each removal of the nuts a new washer must be supplied as the old washer becomes mutilated beyond repair by the backing off of the nut. I obviate the above disadvantage by providing an angular sleeve which is engaged over the nuts when the latter have been advanced to final position and may easily be removed at any time without injury to either the nuts or the sleeve.

In the accompanying drawing, Figure 1 is a side view of a bolt equipped with a lock nut constructed in accordance with my invention. Fig. 2 is a longitudinal sectional view taken on the line 2—2, Fig. 1. Fig. 3 is a perspective view of a bolt equipped with a jam nut and a primary nut constructed in accordance with my invention. Fig. 4 is a detailed perspective view of the locking sleeve. Fig. 5 is a detailed perspective view of the cotter pin.

Referring now to the drawing, 7 designates a bolt having its threaded portion provided with a reduced threaded extension 9, the threads of which run in a counter direction to the portion 8. A primary nut 10 is threaded on the bolt in the usual manner and a jam nut 11 threaded on the reduced portion 9, both nuts being angular in contour with their side faces lying in the same planes.

The above-described bolt and nuts are commonly used in machinery construction and form no part of the present invention, the invention as above stated consisting in a locking sleeve fitted over the above-described nuts as will now be described.

The sleeve 12 is angular in cross dimension and is sufficient in size to engage snugly the outer faces of the primary and jam nuts without unduly binding the same to permit of its mounting and removal without requiring any tool for the operation. A semi-circular rabbet 13 is formed transversely in the side face of the primary nut 10 and a pair of alined openings 14 is formed in the sleeve, the recess and the alined openings coöperating to receive a cotter pin or similar connector 15. It is now clear that the sleeve by engaging the outer faces of the primary nut and jam nut prevents the independent rotation of either nut so that accidental or manual backing off of the nuts is prevented until after the sleeve has been removed. The sleeve 12 being locked to the primary nut by the cotter pin can not become accidentally disengaged from position so that the sleeve can not become dislodged by the jarring of the machinery or railway rails and the like. It will be seen that the lock sleeve is easily mounted and removed from position without injury to either the sleeve or nuts.

From the foregoing description taken in connection with the accompanying drawing it is thought that the operation of my invention will be easily understood without a more extended explanation, it being understood that the various changes in the size and proportion and minor details may be made within the scope of the appended claims.

What is claimed is:—

1. The combination with a bolt having a right hand and left hand screw threaded end, of a primary nut and a lock nut engaging said threaded end, one of said nuts having a transverse groove in its side, a sleeve snugly fitting the side faces of both nuts, having a pair of alined openings in its sides registering with the ends of said groove, and a locking pin engaged through the registering openings in the sleeve and said groove.

2. The combination with a bolt having a right hand and left hand screw threaded end, of a primary nut and a lock nut engaging said threaded end, one of said nuts having a transverse groove in one side face opening at its opposite ends through the adjacent side faces of the nut, a sleeve engaging the side faces of both nuts, and having alined openings registering with the ends of said groove, and a locking pin engaged through the openings in the sleeve and said groove and having terminal retaining means.

In testimony whereof, I affix my signature, in presence of two witnesses.

THOMAS J. BROPHY.

Witnesses:
  A. MARTIN GRAHAM,
  THOMAS W. DICKEY.